United States Patent
Stuntebeck et al.

(10) Patent No.: US 10,165,443 B2
(45) Date of Patent: Dec. 25, 2018

(54) TRANSMITTING MANAGEMENT COMMANDS TO A CLIENT DEVICE

(71) Applicant: VMware, Inc., Palo Alto, CA (US)

(72) Inventors: Erich Peter Stuntebeck, Marietta, GA (US); Varun Murthy, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/401,147

(22) Filed: Jan. 9, 2017

(65) Prior Publication Data
US 2017/0118647 A1 Apr. 27, 2017

Related U.S. Application Data

(62) Division of application No. 14/722,764, filed on May 27, 2015, now Pat. No. 9,544,747.

(51) Int. Cl.
| | |
|---|---|
| *H04M 3/16* | (2006.01) |
| *H04W 12/06* | (2009.01) |
| *H04W 4/14* | (2009.01) |
| *H04L 12/58* | (2006.01) |
| *H04L 29/08* | (2006.01) |

(52) U.S. Cl.
CPC ............. *H04W 12/06* (2013.01); *H04L 51/18* (2013.01); *H04W 4/14* (2013.01); *H04L 67/06* (2013.01)

(58) Field of Classification Search
CPC ....... H04W 12/06; H04W 8/245; H04W 4/14; H04W 80/04; H04L 67/06; H04L 67/142; H04L 67/12; H04L 67/16
USPC ................ 455/411, 418, 466; 709/206, 223; 370/328
See application file for complete search history.

(56) References Cited

U.S. PATENT DOCUMENTS

| | | | | |
|---|---|---|---|---|
| 7,711,802 | B2 * | 5/2010 | Oliver ................... | H04L 12/189 709/206 |
| 8,312,475 | B2 * | 11/2012 | Sareen ................ | H04L 67/2823 709/202 |
| 8,965,329 | B1 * | 2/2015 | Jones .................... | H04W 76/00 340/426.15 |
| 9,154,940 | B2 * | 10/2015 | Miller ................ | H04M 1/72522 |
| 2002/0019725 | A1 * | 2/2002 | Petite .................. | G05B 23/0208 702/188 |
| 2006/0271496 | A1 * | 11/2006 | Balasubramanian .. | G06Q 20/04 705/64 |
| 2007/0099637 | A1 * | 5/2007 | Mangla ................... | H04L 51/04 455/466 |
| 2009/0150400 | A1 * | 6/2009 | Abu-Hakima .... | G06F 17/30864 |

(Continued)

Primary Examiner — Danh C Le
(74) Attorney, Agent, or Firm — Clayton, McKay & Bailey, PC

(57) ABSTRACT

Disclosed are various examples of transmitting management commands to a device using a short message service (SMS) message or voice call. A device may lack network connectivity with a management service. Network capabilities of the device may be disabled or impaired. The management service can generate a SMS message or voice call that includes the management command. The SMS message or voice call can be transmitted to the client device over a cellular network. The SMS message or voice call can include an authentication string with which the authenticity of the SMS message or voice call can be verified. The device can then execute the management command.

17 Claims, 9 Drawing Sheets

(56) References Cited

U.S. PATENT DOCUMENTS

| | | | |
|---|---|---|---|
| 2010/0146057 A1* | 6/2010 | Abu-Hakima | H04L 12/1859 709/206 |
| 2010/0313250 A1* | 12/2010 | Chow | G06F 17/30899 726/5 |
| 2012/0178476 A1* | 7/2012 | Ortiz | H04W 4/025 455/456.6 |
| 2012/0182939 A1* | 7/2012 | Rajan | A61B 5/0008 370/328 |
| 2013/0254314 A1* | 9/2013 | Chow | H04L 67/06 709/206 |
| 2014/0046805 A1* | 2/2014 | Hu | G06Q 30/0635 705/26.81 |
| 2014/0046850 A1* | 2/2014 | Xiang | G06Q 20/322 705/44 |
| 2014/0156992 A1* | 6/2014 | Medin | H04L 51/04 713/168 |
| 2015/0067351 A1* | 3/2015 | Wang | G06F 21/62 713/189 |
| 2015/0195669 A1* | 7/2015 | Grover | H04W 4/003 455/414.1 |
| 2015/0281374 A1* | 10/2015 | Petersen | H04L 67/12 709/223 |
| 2016/0315922 A1* | 10/2016 | Chew | H04L 63/061 |

* cited by examiner

TRANSMITTING MANAGEMENT COMMANDS TO A CLIENT DEVICE

This application claims priority as a divisional application of U.S. application Ser. No. 14/722,764, filed May 27, 2015, which is expressly incorporated herein by reference.

BACKGROUND

In an enterprise setting, users of mobile devices may install and use various enterprise applications in a bring-your-own-device (BYOD) environment. The use of these applications can result in storage of enterprise data on the mobile devices. Security of the data on mobile devices of users is an ongoing concern in a BYOD environment. A user's mobile device may become lost or otherwise removed from service. In these scenarios, it may be desired to remove or erase enterprise data from the user's mobile device.

In some cases, the mobile device can receive a command instructing the device to erase data from the device or perform a factory reset that results in the device being returned to its factory condition. The device typically receives the command over a data connection to a network through which the command is sent. However, mobile devices may not always have a data connection or the ability to receive a command to erase data from the mobile device over a data connection.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is related to transmitting management commands to a client device over short message service (SMS) communications channels. Management commands can include security commands, such as commands to erase data, lock or otherwise secure the client device, or take another action on the client device. A management service can transmit management commands to a client device that is enrolled as a managed device with the management service. As discussed above, in an enterprise setting, client devices can execute various types of applications for enterprise-related use. For example, a client device can execute email applications, messaging applications, calendar applications, word processing applications or other applications. The use of these applications can result in the local storage of enterprise data on the client devices. For example, confidential emails, documents or other enterprise data can be stored on the client device.

In certain scenarios, a management service can issue a management command over a network connection to the client device, such as over the Internet. The management command can instruct an application executed by the client device to perform one or more actions on the client device. For example, a management command can instruct the client device to erase certain data stored on the client device or perform a factory reset whereby user data is erased from the client device. However, a client device, in certain situations, may be inaccessible via a network connection. Therefore, examples of the disclosure involve generating a short message service (SMS) message that contains the management command. The SMS message is communicated to the client device, which can execute the management command on behalf of the management service. In an alternative example, the management service 112 can also initiate a voice call to the client device from a particular phone number and transmit a digital representation of a management command over the voice call.

Figure 1:
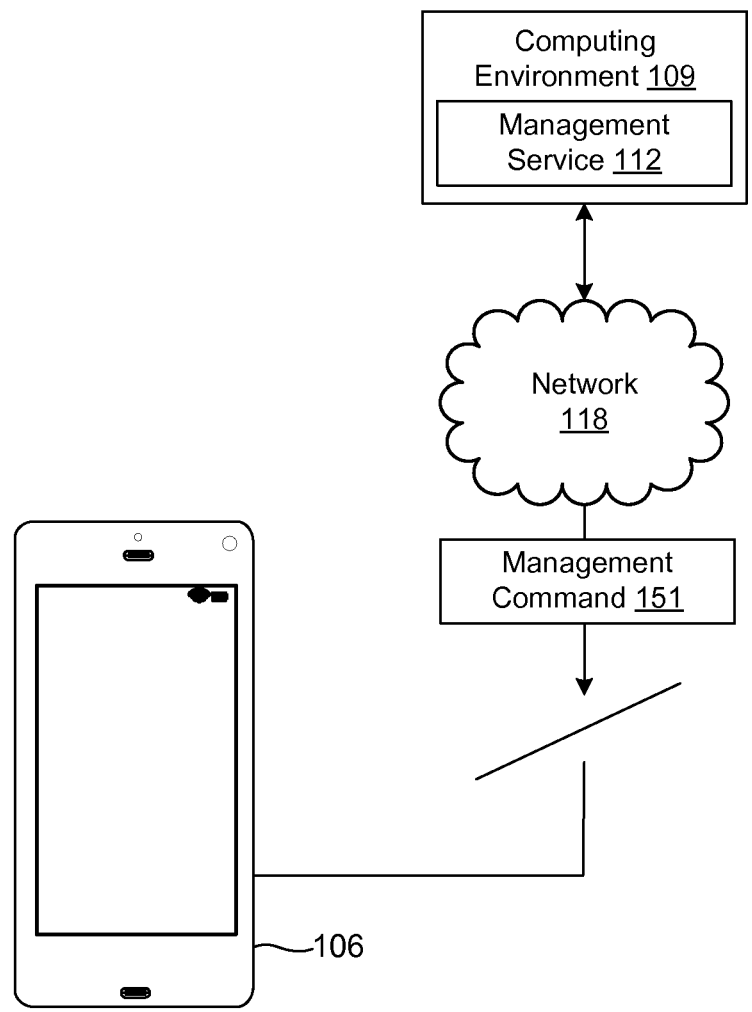
FIGS. 1-2 are drawings of a scenario according to various examples.

In the example scenario of FIG. 1, a client device 106 can include a smartphone, a mobile device, or any other computing device. A computing environment 109 is in communication with a network 118, such as the Internet. The computing environment 109 further executes a management service 112 to manage or oversee the operation of multiple client devices 106. The client device 106 can execute applications that access enterprise-related services, applications, or data, such as, emails, documents, or media content. In some examples, the client device 106 is enrolled with the management service 112 to provide the management service 112 with the authority to manage the client device 106 and so that a user identity can be authenticated and associated with the client device 106 by the management service 112. Enrolling the client device 106 with the management service 112 can include prompting a user to provide credentials associated with a user account. For example, the user can be required to provide a username, a password, a PIN (personal identification number), an email address, biometric data, or other information with which the management service 112 can verify an identity of a user.

In some scenarios, the management service 112 can issue a management command 151 to the client device 106 by transmitting the management command 151 over a network 118, such as the Internet or a local area network. A management command 151 can include a command to erase certain data stored on the client device 106, perform a factory reset of the client device 106 that returns the client device 106 to a factory condition where user data has been erased from the device, or any other command to erase or alter data on the client device 106. A management command 151 can also include a command to enable or disable other functionality associated with the client device 106. For example, a management command 151 can include a command to enable location services or a location detection capability on the client device 106, such as a global positioning system (GPS) capability of the device. As another example, the management command 151 can include a command to enable network services or a network communication capability of the client device 106.

However, in the scenario of FIG. 1, the client device 106 does not have connectivity to the network 118. For example, the network capability of the client device 106 may be impaired or disabled. If a client device 106 has been lost or stolen, the network connection can also be purposefully turned off in an effort to prevent remote management.

Accordingly, because the client device 106 lacks connectivity to the network 118, the management command 151 does not reach the client device 106 over the network 118 and is not executed by the client device 106. For example, if the management command 151 is a command to erase data from the client device 106 due to the device being lost or stolen, the scenario shown in FIG. 1 can result in a situation in which unauthorized users of the client device 106 can access potentially sensitive data.

Figure 2:
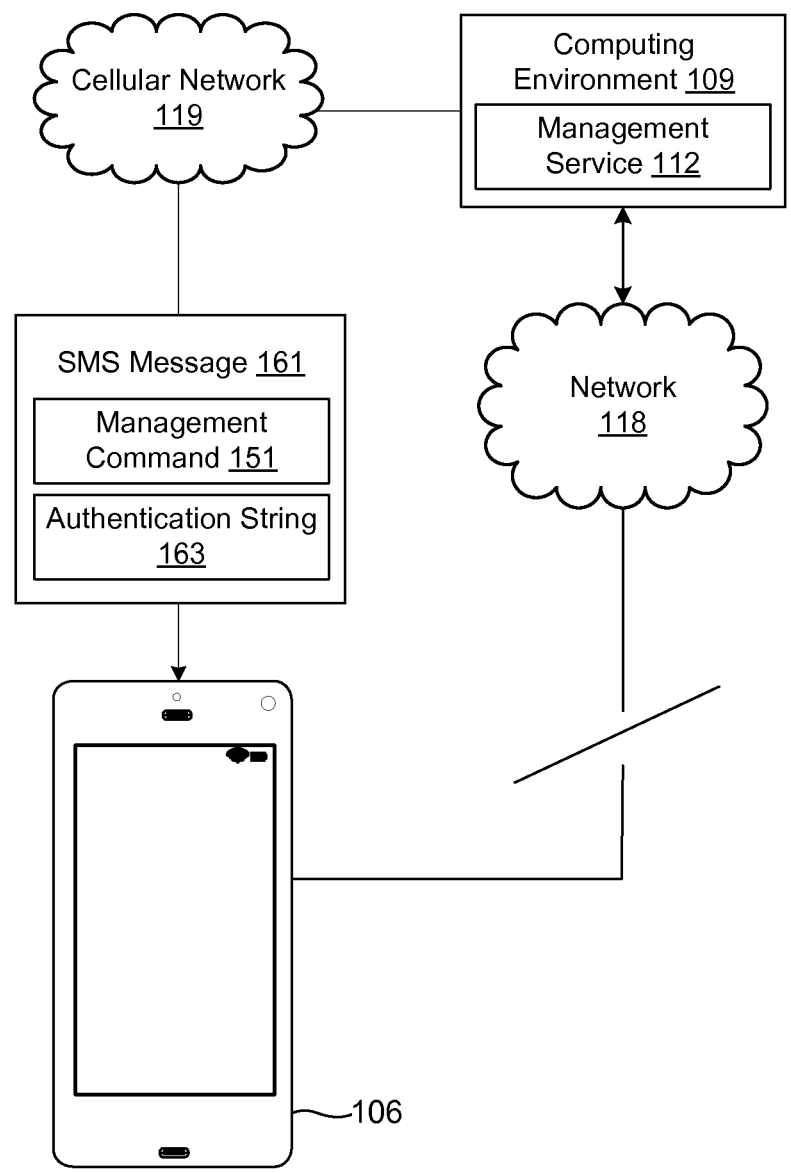

Therefore, reference is now made to FIG. 2, which depicts a scenario in which examples of the disclosure can overcome the lack of connectivity to the network 118 by the client device 106. In the scenario shown in FIG. 2, the management service can generate and transmit a SMS message 161 to the client device 106 over a cellular network 119 to which the client device 106 can connect. The SMS message 161 can include the management command 151 as well as an authentication string 163 that the client device 106 analyzes in order to verify the authenticity of the management command 151 or SMS message 161. In some examples, the SMS message 161 can be transmitted in parallel with a management command 151 that is transmitted to the client device 106 over the network 118. In response to receiving an authenticated SMS message 161 containing a management command 151, the client device 106 can execute the management command 151 by performing one or more actions specified by the management command 151. In some examples, rather than a SMS message 161 being used to deliver the management command 151 over the cellular network 119, a voice call can also be initiated. The management service 112 can embed a digital representation of a management command 151 and authentication string 163 that can be extracted from the audio within the voice call by the client device 106. The client device 106 can similarly execute the management command 151 extracted from the voice call.

Figure 3:
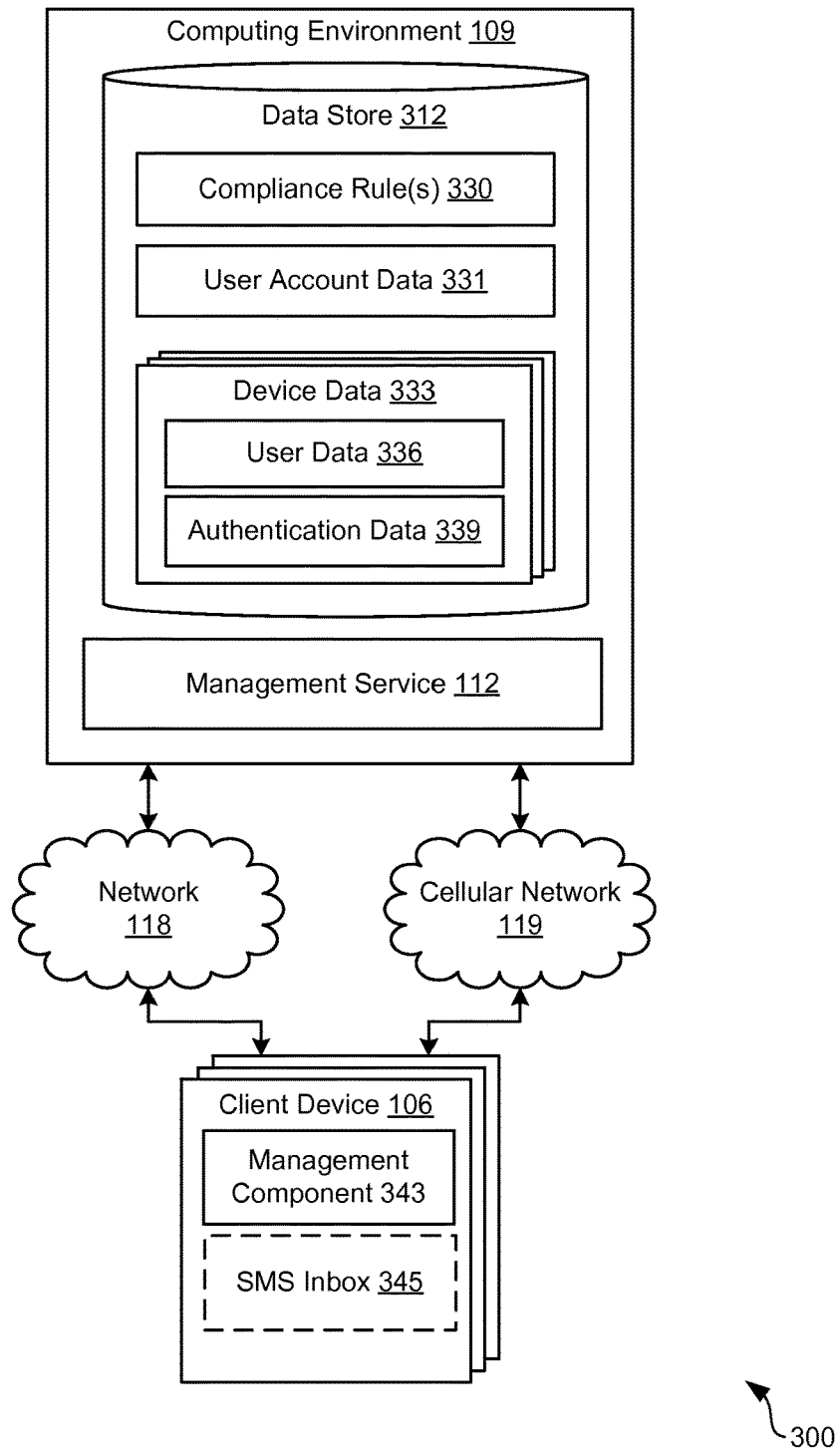
FIG. 3 is a drawing of a networked environment according to various examples.

With reference to FIG. 3, shown is a networked environment 300 according to various examples. The networked environment 300 includes a client device 106 and a computing environment 109, which can be in data communication with each other over the network 118 and cellular network 119. The network 118 includes, for example, the Internet, one or more intranets, extranets, wide area networks (WANs), local area networks (LANs), wired networks, wireless networks, other suitable networks, or any combination of two or more such networks. For example, such networks can include satellite networks, cable networks, Ethernet networks, and other types of networks.

The cellular network 119 can include a network such as a wireless carrier network in which mobile telephony and messaging services are provided. In some examples, the computing environment 109 may not have direct access to the cellular network 119, but can generate SMS messages that are transmitted to client devices 106 using an application programming interface (API) provided by one or more wireless carriers.

The computing environment 109 can include, for example, a server computer or any other system providing computing capabilities. Alternatively, the computing environment 109 can employ multiple computing devices that can be arranged, for example, in one or more server banks, computer banks, or other arrangements. The computing devices can be located in a single installation or can be distributed among many different geographical locations. For example, the computing environment 109 can include multiple computing devices that together form a hosted computing resource, a grid computing resource, or any other distributed computing arrangement. In some cases, the computing environment 109 can operate as at least a portion of an elastic computing resource where the allotted capacity of processing, network, storage, or other computing-related resources can vary over time. The computing environment 109 can also include or be operated as one or more virtualized computer instances. Generally, the computing environment 109 is operated in accordance with particular security protocols such that it is considered a trusted computing environment. The data stored in the data store 116 is associated with the operation of the various components described below.

A management service 112 or other systems can be executed in the computing environment 109. The management service 112 can manage or oversee the operation of multiple client devices 106. In some examples, an enterprise, such as one or more companies or other organizations, can operate the management service 112 to oversee or manage the operation of the client devices 106 of employees, contractors, or other users within an enterprise environment.

The management service 112 can facilitate ensuring that client devices 106 that are administered by the management service 112 are operating in compliance with various compliance rules. In one scenario, the management service 112 can issue management commands that instruct a client device 106 to take a particular action with respect to a compliance rule.

The data stored in the data store 312 includes, for example, compliance rules 330, device data 333, and potentially other data. Within the context of an enterprise, compliance rules 330 include one or more rules that, when violated, can cause the management service 112 to issue a management command. Compliance rules 330 can include a list of unauthorized hardware functions, software functions, or applications that potentially pose a threat to enterprise data or use of enterprise applications. In various examples, if client device 106 falls out of compliance with one or more compliance rules 330, a management command 151 can be transmitted to the client device 106 instructing the client device 106 to perform one or more actions specified by the compliance rule 330. For example, a compliance rule 330 can specify that if a client device 106 exits within a particular geographic location, the client device 106 should erase certain data or enable/disable certain functionality. As another example, a compliance rule 330 can specify that if the client device 106 is tagged as lost or stolen by a user or administrator, the client device 106 should be issued a management command 151 instructing the device to erase all enterprise data or user data from the device.

User account data 331 can include, for example, a username, an email address, a password, biometric information, or other user information that can be used to identify a user of the client device 106. The user account data 331 can also include email, documents, calendar data, contacts, or other data that is synchronized with or accessed by the client device 106. User account data 331 can also identify applications that are installed on the client device 106 that are managed by or distributed by the management service 112 to the client device 106.

The device data 333 can include information about particular client devices 106 that are registered with the management service 112 as managed or enrolled devices. The device data 333 can include user data 336, authentication data 339, and potentially other data. User data 336 can identify data that is stored on the client device 106 that is considered enterprise data, such as, specific data from the user account data 331 that is stored on a particular client device 106. For example, a user's smartphone can store different data than a user's tablet device. In one scenario, a user's smartphone can be configured to synchronize enterprise email associated with the user account but not any of the user's documents. In contrast, the user's tablet can be configured to receive the user's email as well as synchronize the user's documents. Accordingly, user data 336 can identify which data from user account data 331 should be synchronized with the various client devices 106 that can be associated with a particular user account.

Authentication data 339 can contain information with which a client device 106 can authenticate a management command 151 received from management service 112. The authentication data 339 can include a shared secret or password that can be embedded within a SMS message 161 as an authentication string 163. In this scenario, the client device 106, before executing a management command 151 received in a SMS message 161, can verify that the SMS message 161 contains the expected authentication string 163. The authentication data 339 can also include a public key associated with the client device 106 that can be used to encrypt the SMS message 161 or the management command 151. The authentication data 339 can also include a seed for a time-varying password that can be embedded as an authentication string 163. In this scenario, the client device 106, before executing a management command 151 received in a SMS message 161, can verify that the SMS message 161 contains the expected authentication string 163 in the form of a time-varying password that the client device 106 can independently generate.

The client device 106 is representative of multiple client devices 106 that can be coupled to the network 113. For example, multiple client devices 106 can be a fleet of devices in a classroom setting, an educational setting, or any other setting in which the devices can be clustered together in a particular location or located across many different locations. The client device 106 can include, for example, a processor-based system such as a computer system. The computer system can be embodied in the form of a desktop computer, a laptop computer, a personal digital assistant, a mobile phone, a smartphone, a set-top box, a music player, a web pad, a tablet computer system, a game console, an electronic book reader, or any other device with like capability. The client device 106 can include a display as well as one or more input devices, such as a mouse or touch pad that facilitates user input or other types of data input into the client device 106.

The client device 106 can execute a management component 343 or other components. The management component 343 can monitor or manage at least a portion of the data, applications, or hardware components for the client device 106. The management component 343 can also identify whether the client device 106 is operating in accordance with the compliance rules that have been assigned to the client device 106. In some embodiments, the management component 343 can function as a portion of an operating system for the client device 106. In other embodiments, the management component 343 can function in the application layer of the client device 106. Alternatively, the management component 343 can be a portion of an application that was developed, for example, using a Software Development Kit (SDK) that facilitates the inclusion of functionality within the application that monitors or manages at least a portion of the resources for the client device 106.

The management component 343 can be executed by the client device 106 automatically upon startup of the client device 106. Additionally, the management component 343 can run as a background process in the client device 106. Accordingly, the management component 343 can execute without user intervention in some embodiments. Additionally, the management component 343 can communicate with the management service 112 in order to facilitate management of the client device 106 and enforcement of compliance rules 330. For example, the management component 343 can obtain compliance rules from the management service 112, and the management component 343 can determine whether the client device 106 is operating in accordance with those compliance rules. In another example, the management component 343 transmits data that indicates the status of the client device 106 to the management service 112, and the management service 112 uses this data to determine whether the client device 106 is operating in accordance with compliance rules 330. If it is determined that the client device 106 is not in compliance with one or more compliance rules, the management component 343 or the management service 112 initiates a remedial action.

The client device 106 can also store a SMS inbox 345, which can be integrated within the operating system of the client device 106 or a SMS messaging application executed by the client device 106. The SMS inbox 345 can include SMS messages that are received by the client device 106 through the cellular network 119. In one scenario, the management component 343 can be installed or executed with sufficient privileges such that it can access SMS messages in the SMS inbox 345. In another scenario, the management component 343 can subscribe to operating system events or notifications that correspond to receipt of a SMS message, analyze the message content of the SMS message, and determine from the message content whether a management command 151 is embedded within the SMS message. Then, the management component 343 can execute the management command 151 and take actions that are specified by the management command 151. In this way, the management component 343 can act on management commands 151 that are received in a SMS message 161 when connectivity to the network 118 is impaired or disabled but connectivity to the cellular network 119 is functioning.

In some examples, rather than a SMS message 161 being used to deliver the management command 151 over the cellular network 119, a voice call can also be initiated. The management service 112 can embed a digital representation of a management command 151 and authentication string 163 that can be extracted from the audio within the voice call by the client device 106. The client device 106 can similarly execute the management command 151 extracted from the voice call. In this scenario, the management component 343 can be installed or executed with sufficient privileges to access an audio or data stream from a voice call that is received from a phone number that is associated with the management service 112.

As noted above, if a particular client device 106 is designated as lost, stolen, or otherwise decommissioned for use with the management service 112, an administrator can issue a management command 151 using the management service 112. The management command 151 can instruct the management component 343 to erase data from the client device 106. If the management service 112 fails to successfully transmit the management command 151 to the client device 106 over the network 118, then management service 112 can then generate a SMS message 161 that includes the management command 151. In one scenario, the management service 112 can detect a failure to transmit the management command 151 to the client device 106 over the network 118 if the client device 106 fails to acknowledge the management command 151 by transmitting a confirmation back to the management service 112.

In another scenario, if a client device 106 has been unreachable using the network 118 for a threshold amount of time, the management service 112 can issue a management command 151 in a SMS message 161 that instructs the client device 106 to enable network services within the client device 106. In another scenario, if a client device 106 has been unreachable using the network 118 for a threshold amount of time, the management service 112 can make a determination that the client device 106 is lost or stolen and can issue a management command 151 in a SMS message 161 that instructs the client device 106 erase data or perform a factory reset. For example, client device 106 can periodically transmit a message to management service 112 indicating an operational status and optionally other information relevant to device management. If a defined number of expected messages have not been received, or an amount of time has passed since the last message was received, management service 112 can consider the client device 106 to be unreachable.

Figure 4:
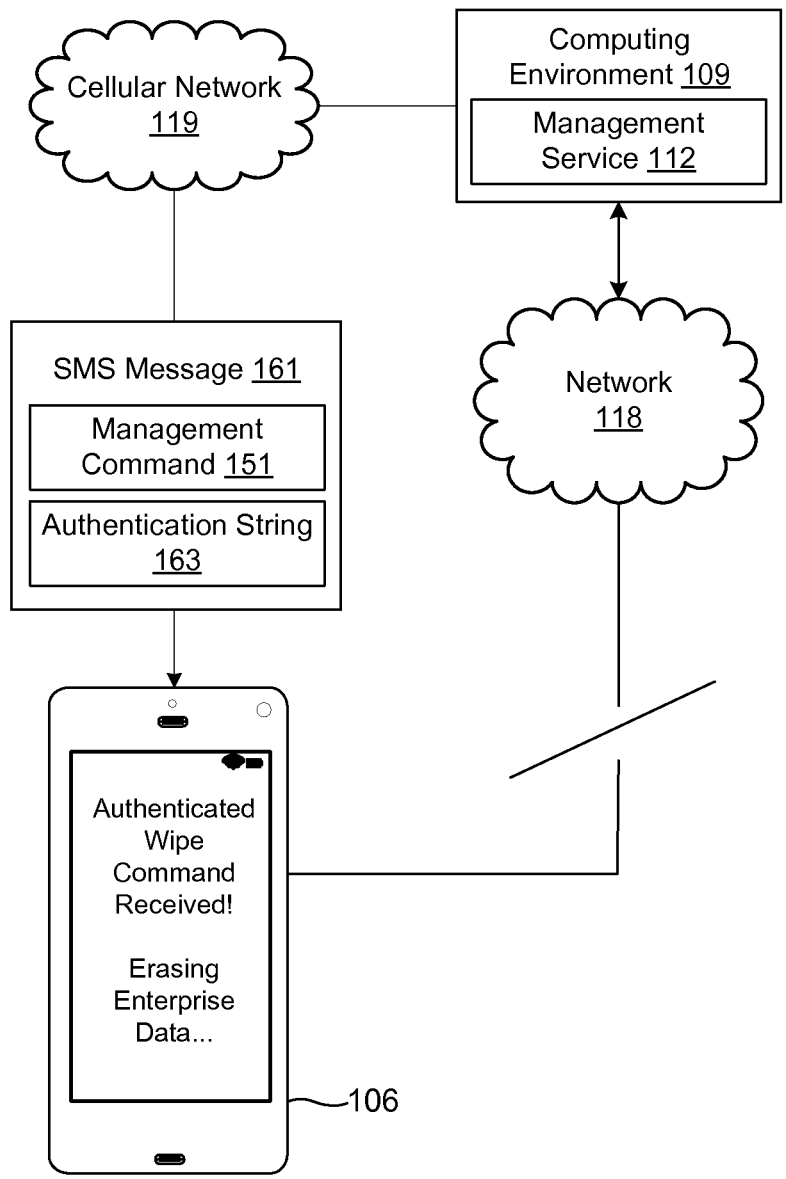
FIGS. 4-7 are drawings of additional scenarios according to various examples.

Reference is now made to FIG. 4, which illustrates an example according to the disclosure. In the example of FIG. 4, the client device 106 is designated as lost or stolen. The access of the client device 106 to the network 118 is impaired or disabled such that a management command 151 cannot be transmitted to the client device 106 through the network 118. Accordingly, the management service 112 can transmit a management command 151 to the management component 343 instructing the client device to erase data, perform a factory reset, or take any other action that can be specified in the management command 151 in response to a lost or stolen device. If the management service 112 fails to transmit the management command 151 to the management component 343 over the network 118, the management service 112 can generate a SMS message 161 that contains the management command 151 as well as an authentication string 163 that the management component 343 can use to verify the authenticity of the management command 151.

When a SMS message 161 is delivered to the SMS inbox 345 of the client device 106, the management component 343 can extract the SMS message 161 and determine whether a management command 151 is embedded in the message. The management component 343 can detect delivery of the SMS message 161 to the SMS inbox 345 and extract the management command 151 and authentication string 163. The management component 343 can verify the authenticity of the SMS message 161 based upon a sender address of the SMS message 161, such as a phone number, SMS short code, email address, or other sender identifying information within the SMS message 161. The management component 343 can also verify the authenticity of the message by determining whether the authentication string 163 contains an expected value, such as a shared secret, an expected password value, a time-varying password value, or any other value that the management component 343 can authenticate.

Upon verifying the authenticity of the SMS message 161, the management component 343 can execute the management command 151 by taking the actions specified in the management command 151. The management command 151 can include instructions to erase certain data from the client device 106. In this way, the management command 151 can be delivered and acted upon even when connectivity to the network 118 is disabled or impaired.

The SMS message can be hidden from the normal inbox on the client device 106 so that a user is unaware that the device has received a management command 151 in a SMS message. In other words, the management component 343 can suppress a device notification associated with receipt of a SMS message. In some examples, the management component 343 can delete a SMS message containing a management command 151 from the SMS inbox 345 upon extracting the management command 151 from the SMS message. In another example, as shown in FIG. 4, a notification of receiving a SMS management command can be displayed. As described below, the user can be given a chance to authenticate with a server before certain commands are executed. For example, a user can avoid execution of a remote wipe command by authenticating with the server.

Figure 5:
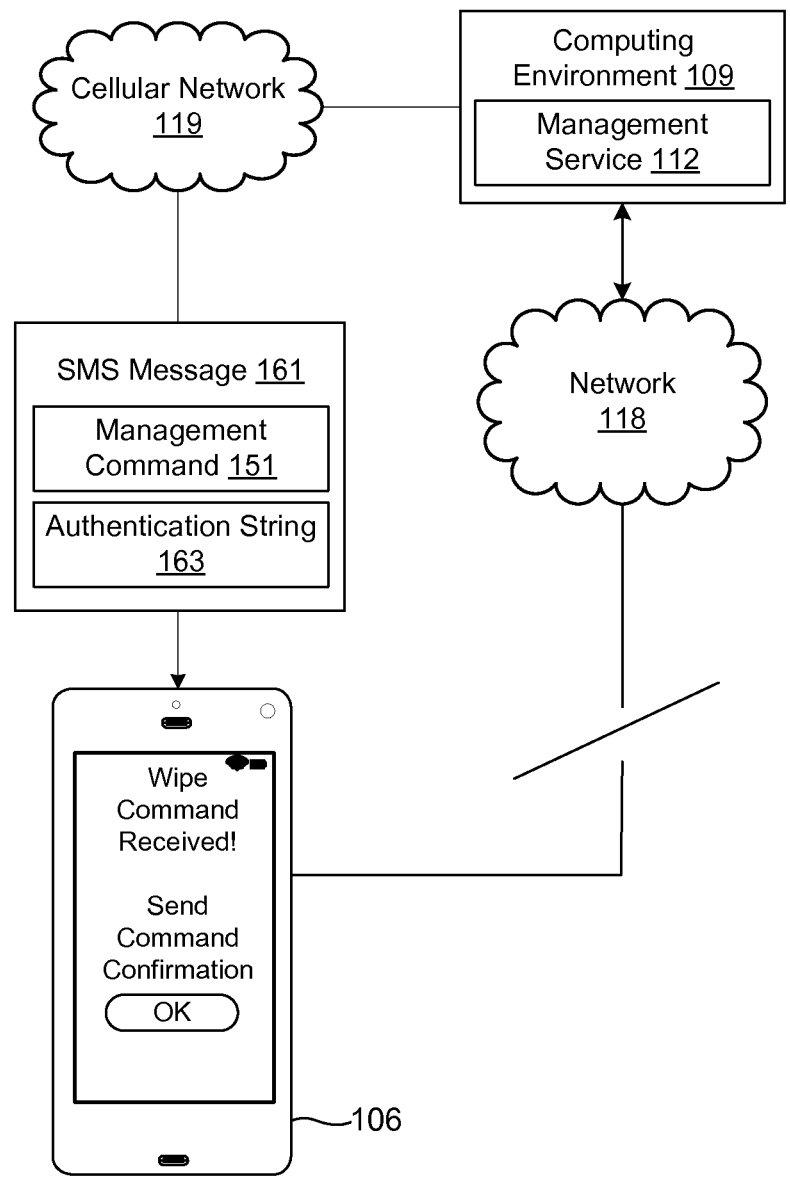

Referring next to FIG. 5, shown is an alternative scenario. The management component 343 can allow a user of the client device 106 to confirm a management command 151 received in a SMS message 161. User confirmation of the management command 151 can be desired to facilitate an additional layer of authentication of the management command 151. For example, if a management command 151 is transmitted to the management component 343 by a malicious actor that has spoofed sender information that is embedded within the SMS message 161 as well as potentially gained access to the authentication string 163, an additional layer of authentication can be imposed as described in the context of FIGS. 5-7. As shown, the management component 343 can request a user acknowledgement of receipt of the management command 151 and include a user interface element that causes a command confirmation to be sent to the management service 112. The command confirmation can be transmitted to the management service 112 at a predefined recipient address or telephone number.

Figure 6:
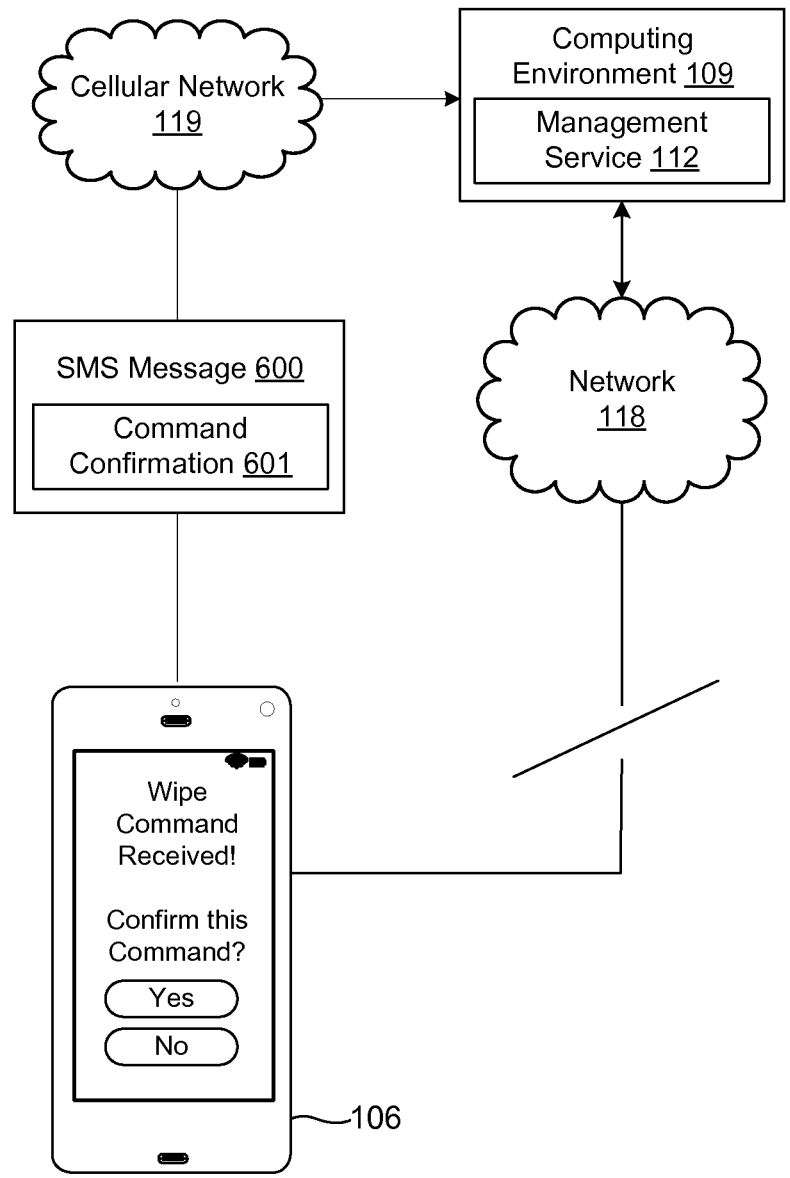
Figure 7:
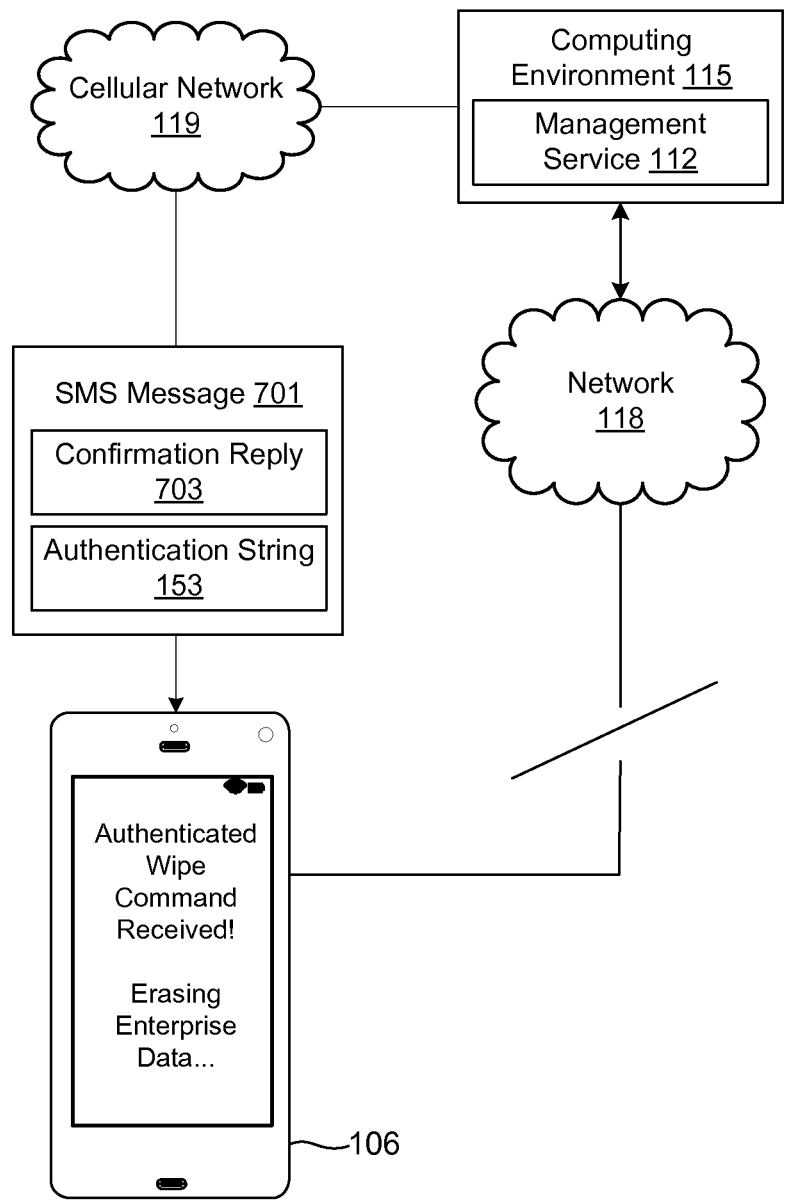

As shown in FIG. 6, the command confirmation 601 can be embedded within a SMS message 600 that is generated by the management component 343 and transmitted to the management service 112 at the predefined recipient address. In this way, the management component 343 can seek confirmation of the management command 151 and can communicate with the management service 112 to verify that the sender information in the SMS message 161 received in FIG. 5 has not been spoofed. Referring next to FIG. 7, upon receiving the command confirmation 601 from the client device 106, the management service 112 can generate another SMS message 701 that contains a confirmation reply 703. The SMS message 701 can also include another authentication string 153. The confirmation reply 703 can have the effect of confirming the management command 151 received by the management component 343 and extracted from the SMS message 161 shown in FIG. 5. Upon receiving the confirmation reply 703, the management component 343 can execute the management command 151 received from the management service 112 as shown in FIG. 5. If no confirmation reply 703 is received from the management service 112 within a threshold amount of time, the management component 343 can discard the management command 151.

Figure 8:
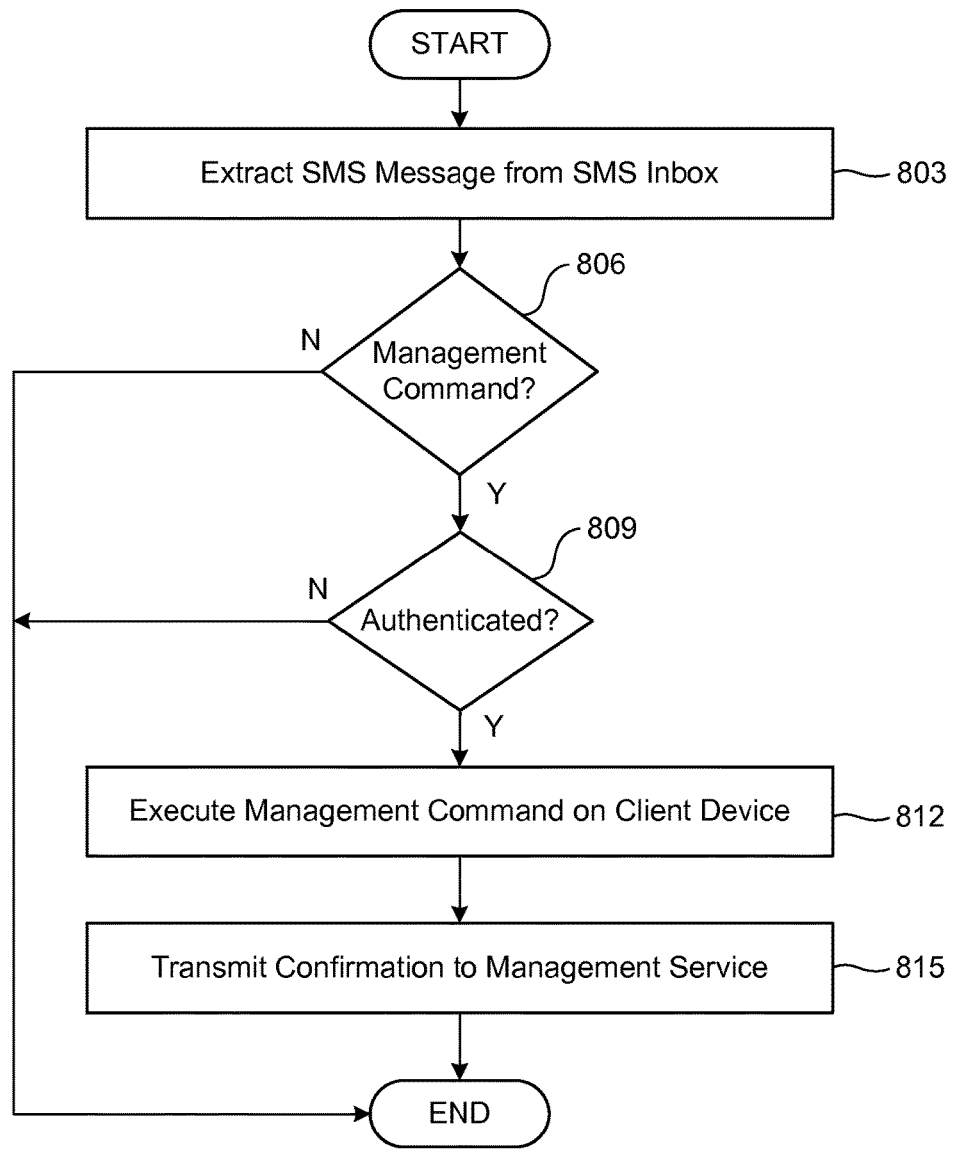
FIG. 8 is a flowchart illustrating an example of functionality implemented by the management client component according to various examples.

Referring next to FIG. 8, shown is a flowchart that provides one example of the operation of a portion of the management component 343. Functionality attributed to the management component 343 can be implemented in a single process or application executed by the client device 106 and/or multiple processes or applications. The separation or segmentation of functionality as discussed herein is presented for illustrative purposes only.

Beginning with step 803, the management component 343 can extract a SMS message that is received by the client device 106 and stored in a SMS inbox 345. At step 806, the management component 343 can determine whether the SMS message 161 contains a management command 151. In one scenario, the SMS message 161 can include one or more keywords or tags that identify the message content of the SMS message 161 as a management command 151. In another scenario, the SMS message 600 can be associated with a particular sender address that the management component 343 can identify as a sender that is associated with a management command 151. If the SMS message 161 does not include a management command 151, then at step 806, the process can proceed to completion. Because the SMS message 161 does not contain a management message, it can be processed and displayed as a normal SMS message.

If the SMS message 161 does include a management command 151, the process proceeds to step 809, where the management component 343 can authenticate the SMS message 161 and/or management command 151. The management component 343 can determine whether the message content of the SMS message 161 contains an authentication string 163 having an expected value. As noted above, the authentication string 163 can include a pre-shared secret, a password, a time-varying password, or any other string that can be authenticated by the management component 343. The authentication string 163 can also include a unique device identifier. A device identifier can include a unique hardware identifier, such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU identifier, or any combination of two or more such hardware identifiers. In another example, the device identifier may be a unique software identifier, such as a token or certificate, that is based on the aforementioned unique hardware identifiers. If the management component 343 cannot authenticate the SMS message 161, then the process can proceed to completion, as the management component 343 can ignore the contents of the SMS message 161.

If the management component 343 authenticates the SMS message 161, then at step 812, the management component 343 can execute the management command 151 contained within the SMS message 161. The management command 151 can include instructions to erase certain data from the client device 106. For example, the management command 151 can identify types of data that should be erased from the client device 106, such as certain email accounts, certain documents, contacts, or other data. The management command 151 can also specify that data associated with particular applications or user accounts should be erased. In some scenarios, the management command 151 can specify that a factory reset should be performed on the client device 106 whereby all user data is erased and the client device 106 is returned to a factory condition.

The management command 151 can also instruct that the management component 343 take other actions. For example, the management command 151 can instruct that the management component 343 enable or disable network services or location services on the client device 106. The management command 151 can also instruct that the management component 343 enable or disable roaming functionality of the client device 106. In another scenario, the management command 151 can instruct the management component 343 to initiate enrollment of the client device 106 with the management service 112 or any other enterprise mobility management (EMM) system. To this end, the management command 151 can include a server address, user identifier, a password or credentials associated with the user identifier, or any other information to facilitate enrollment of the client device 106.

When the command would restrict device or data usage, the user can be given an opportunity to override execution of the command by authenticating with management service 112. For example, if a client device 106 has not checked in with management service 112 for a given period, an instruction can be sent to the client device 106 to erase enterprise data. The command can also prompt a user to authenticate by, for example, providing a user name and password. If the management service 112 receives the proper authentication credentials, it can cancel the command. In this example, the authentication credentials indicate the client device 106 has not been lost or stolen.

After executing the management command 151, the management component 343 can transmit a confirmation to the management service 112 that the management command 151 was executed in step 815. In one scenario, the confirmation can be transmitted to the management service 112 in a SMS message that is generated by the management component 343. The SMS message generated by the management component 343 can also include an authentication string with which the management service 112 can verify the authenticity of the SMS message. Thereafter, the process proceeds to completion.

As noted above, in some examples, rather than a SMS message 161 being used to deliver the management command 151 over the cellular network 119, the management service 112 can also initiate a voice call with the client device 106 over the cellular network. The management service 112 can embed a digital representation of a management command 151 and authentication string 163 that can be extracted from the audio within the voice call by the client device 106. The client device 106 can similarly execute the management command 151 extracted from the voice call.

Figure 9:
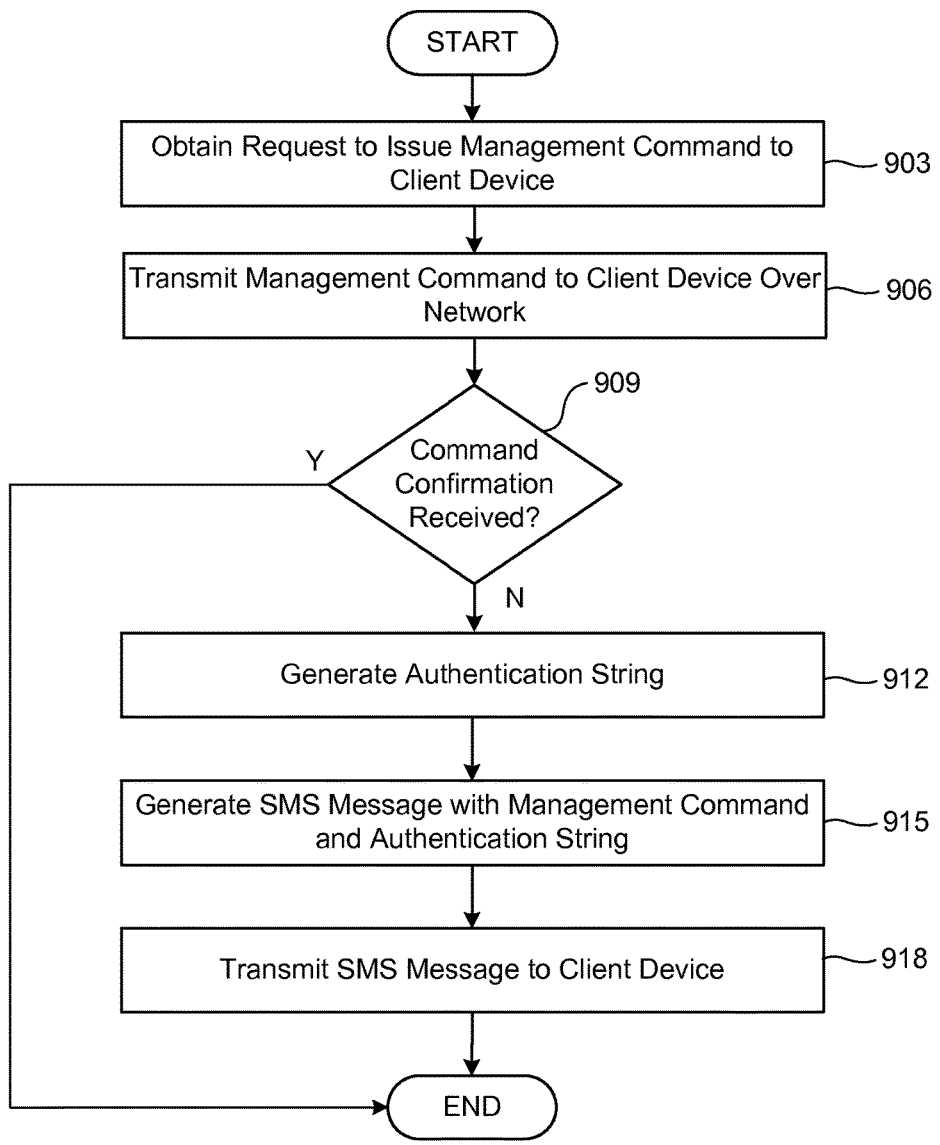
FIG. 9 is a flowchart illustrating an example of functionality implemented by the management service according to various examples.

Referring next to FIG. 9, shown is a flowchart that provides one example of the operation of a portion of the management service 112. Functionality attributed to the management service 112 can be implemented in a single process or application executed by the computing environment 109 or multiple processes or applications. The separation or segmentation of functionality as discussed herein is presented for illustrative purposes only.

First, at step 903, the management service 112 can obtain a request to issue a management command 151 to a client device 106. The request to issue the management command 151 can originate from an administrator or be automatically generated by the management service 112. For example, if a client device 106 is designated as lost or stolen, a policy can be defined in the management service 112 that specifies certain actions that should be taken by the management service 112. In response to a device being designated as lost or stolen by a user or administrator, the management service 112 can automatically generate and transmit a management command 151 to the client device 106 on behalf of the user or administrator.

At step 906, the management service 112 can transmit the management command 151 to the client device 106 over the network 118. At step 909, if the client device 106 confirms receipt or execution of the management command 151, the process can proceed to completion. If the client device 106 does not confirm receipt of the management command 151 within a threshold period of time, the process can proceed to step 912, where the management service 112 can generate an authentication string 163 from the authentication data 339 associated with the client device 106. Next, at step 915, the management service 112 can generate a SMS message 161 that contains the authentication string 163 and management command 151. At step 918, the management service 112 can transmit the SMS message 161 to the client device 106 via the cellular network 119. Thereafter, the process proceeds to completion.

The flowcharts of FIGS. 8-9 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 106, computing environment 109, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the management service 112, the management component 343 and/or other components can be stored in one or more storage devices and be executable by one or more processors. Also, a data store, such as the data store 312 can be stored in the one or more storage devices.

The management service 112, the management component 343, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A method for transmitting commands to a client device enrolled with a management service, comprising:
    obtaining a request to transmit a management command, executable by a client device, to the client device;
    attempting to transmit the management command to the client over a data connection;
    determining that the client device has lost the data connection in response to a failure to receive a confirmation that the client device executed the management command; and
    transmitting a message to the client device in response to determining that the client device has lost a data connection and has not reestablished the data connection, the message including the management command.

2. The method of claim 1, wherein the message comprises a SMS message and the management service is further configured to at least include an authentication string within the SMS message.

3. The method of claim 1, wherein the management command comprises at least one of a command to erase data from the client device, a command to restore the client device to a factory condition, or a command to initiate enrollment of the client device with the management service.

4. The method of claim 1, wherein the message comprises a voice call.

5. The method of claim 1, wherein the message is generated in parallel with transmission of the management command to the client device over a network connection.

6. The method of claim 1, further comprising:
    receiving a response to the management command, the response including an indication of an execution status of the management command.

7. A non-transitory computer readable medium comprising instructions which, when executed by a processor, transmit commands to a client device enrolled with a management service, the instructions being configured to:
    obtain a request to transmit a management command, executable by a client device, to the client device;

attempting to transmit the management command to the client device over a data connection;

determine that the client device has lost the data connection in response to a failure to receive a confirmation that the client device executed the management command; and transmit a message to the client device in response to determining that the client device has lost a data connection and has not reestablished the data connection, the message including the management command.

8. The computer readable medium of claim 7, wherein the message comprises a SMS message and the instructions are further configured to at least include an authentication string within the SMS message.

9. The computer readable medium of claim 7, wherein the management command comprises at least one of a command to erase data from the client device, a command to restore the client device to a factory condition, or a command to initiate enrollment of the client device with the management service.

10. The computer readable medium of claim 7, wherein the message comprises a voice call.

11. The computer readable medium of claim 7, wherein the message is generated in parallel with transmission of the management command to the client device over a network connection.

12. The computer readable medium of claim 7, further comprising instructions which, when executed:

receive a response to the management command, the response including an indication of an execution status of the management command.

13. A system, comprising:

at least one computing device; and a management service executed by the at least one computing device, the management service configured to at least:

obtain a request to transmit a management command, executable by a client device, to the client device;

attempting to transmit the management command to the client device over a data connection;

determine that the client device has lost the data connection in response to a failure to receive a confirmation that the client device executed the management command;

transmit a message to the client device in response to determining that the client device has lost a data connection and has not reestablished the data connection, the message including the management command.

14. The system of claim 13, wherein the message comprises a SMS message and the management service is further configured to at least include an authentication string within the SMS message.

15. The system of claim 13, wherein the management command comprises at least one of a command to erase data from the client device, a command to restore the client device to a factory condition, or a command to initiate enrollment of the client device with the management service.

16. The system of claim 13, wherein the message comprises a voice call.

17. The system of claim 13, wherein the message is generated in parallel with transmission of the management command to the client device over a network connection.

* * * * *